United States Patent
Vanasse et al.

[11] Patent Number: 5,189,554
[45] Date of Patent: Feb. 23, 1993

[54] TELESCOPE BAFFLE SYSTEM

[75] Inventors: George A. Vanasse, Chelmsford; Ernest R. Huppi, Concord, both of Mass.

[73] Assignee: The United States of America as represented by the Secretary of the Air Force, Washington, D.C.

[21] Appl. No.: 771,378

[22] Filed: Sep. 30, 1991

[51] Int. Cl.$^5$ .............................................. G02B 27/00
[52] U.S. Cl. ........................... 359/601; 359/611; 359/399; 359/530
[58] Field of Search ............... 359/601, 603, 399, 611, 359/613, 300, 530, 529; 356/437; 250/338.5

[56] References Cited

U.S. PATENT DOCUMENTS

| | | | |
|---|---|---|---|
| 3,445,659 | 5/1969 | Guimento et al. | 250/83 |
| 3,488,103 | 1/1970 | Webb | 359/611 |
| 3,699,471 | 10/1972 | Mulready et al. | 331/94.5 |
| 4,217,026 | 8/1980 | Radovich | 359/611 |
| 4,431,917 | 2/1984 | Gibbons | 250/332 |
| 4,507,551 | 3/1985 | Howard et al. | 250/216 |
| 4,529,273 | 7/1985 | Cronin-Golomb et al. | 359/300 |
| 4,542,963 | 9/1985 | Linlor | 359/399 |
| 4,634,854 | 1/1987 | Wirick | 250/216 |
| 4,895,428 | 1/1990 | Nelson et al. | 359/530 |

*Primary Examiner*—Loha Ben
*Attorney, Agent, or Firm*—William G. Auton; Donald J. Singer

[57] ABSTRACT

A telescope baffle system is disclosed for use with optical instruments. The baffle structure consists of highly reflective low scatter annular arrays of retro-reflecting cube corners which have the capability of returning rays back upon themselves such that most off-axis radiation striking one of the baffle annular arrays is reflected back to its source rather than being absorbed or scattered by the baffle.

20 Claims, 2 Drawing Sheets

TELESCOPE BAFFLE SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to optical instruments, and more specifically the invention pertains to a telescope baffle system for eliminating the off-axis stray radiation which, in current baffle designs reaches the image plane on optical telescope radiation of images captured in an optical telescope.

A telescope is an instrument used to collect radiation for the study of distant objects. A telescope is commonly regarded as an optical instrument that images visible light by means of lenses, mirrors, or both, to augment the eye with respect to resolution and light-gathering power. Instruments designed to collect invisible radiation, as gamma rays, x-rays, cosmic rays, and other atomic particles, as well as ultraviolet and infrared light and radio waves, are also called telescopes.

Although the technology of making lenses for eyeglasses was begun late in the 13th century, it was not until the beginning of the 17th century that telescopes came into use. When lenses are used to form images, optical instruments are called refractors. Sophisticated examples of the refracting telescope, made famous by Galileo, include astronomical and terrestrial telescopes with objectives (the first image-forming lens) up to 40 in (1.016 m) in diameter. Binoculars, opera glasses, gunsights, theodolites, periscopes, range finders, and cameras in great variety are other examples.

The images captured by these various systems are all subject to contamination by undesired off-axis radiation.

The task of eliminating off-axis radiation from optical instruments is alleviated, to some extent, by the systems disclosed in the following U.S. Patents, the disclosures of which are incorporated herein by reference:

U.S. Pat. No. 4,895,428 issued to Nelso et al;
U.S. Pat. No. 4,542,963 issued to Linlor;
U.S. Pat. No. 3,488,103 issued to Wirick;
U.S. Pat. No. 4,529,273 issued to Cronin-Golomb;
U.S. Pat. No. 3,445,659 issued to Guimento et al;
U.S. Pat. No. 3,699,471 issued to Mulready et al;
U.S. Pat. No. 4,217,026 issued to Radovich;
U.S. Pat. No. 4,431,917 issued to Gibbons and
U.S. Pat. No. 4,507,551 issued to Howard et al.

The Linlor patent discloses an optical system with reflective baffles. In Linlor, reflective baffles extend circumferentially around the tube of a telescope. The Linlor baffles are reflective on both their forward (input) sides as well as their rearward sides.

In addition to the Linlor system, others have given their attention to the use of reflective baffles in optical systems. For example, Davis, U.S. Pat. No. 3,488,103, issued Jan. 6, 1970 discloses a reflecting baffle having a concave, elliptical surface facing the direction off-axis rays enter an optical system. However, in order for the system there disclosed to exclude off-axis radiation sufficiently, the field of view of the optical system must be substantially reduced. Radovich, U.S. Pat. No. 4,217,026, issued Aug. 12, 1980, discloses an optical system incorporating a plurality of baffles that are each also concave with respect to the incident radiation to be reflected. This system also results in substantial reduction of the field of view, and it is only partially effective for rejecting off-axis rays. A similar system is described by Rock et al, "Use of Reflective baffles for Control of Aperture Heat Loads and Stray Radiation," Optical Systems Engineering, Proceedings of SPIE, Vol. 330, pp. 60–65, January 1982, in which radiation absorbing surfaces are placed in the vicinity of the first baffle, in order to prevent skew rays from reaching the image plane. Such a system is also disclosed by Bremer, "Baffle Design for Earth Radiation Rejection in the Cryogenic Limb Scanning Interferometer/Radiometer," Optical Engineering, Vol. 22, No. 1, pp. 166–171, January–February 1983.

The purpose of the baffle section of an optical sensor is to prevent unwanted off-axis radiation from reaching the telescope and then being scattered onto the detector. In the past this has been accomplished by using a baffle tube with internal annular rings which are coated with some type of black absorbing material, usually black paint. The black coating does not absorb 100 percent of the off axis radiation, which results in a fraction of the unwanted radiation being scattered to the optical surfaces of the telescope. The telescope optical surfaces in turn scatter a portion of the radiation into the field of view where it is then focused onto the detectors of the optical sensor. The amount of unwanted off-axis radiation which eventually reaches the detectors depends on the effectiveness of the baffle and the scatter properties of the telescope optical surfaces. In addition, the black coating is usually not equally effective at all wavelengths and poor off-axis rejection can occur at wavelengths where the coating is a poor absorber. An infrared sensor would usually require the baffle to be cooled to prevent thermal emission from the baffle. The black coating absorbs off-axis thermal radiation which tends to increase the baffle temperature and increases the heat load on the sensor which increases the refrigeration required to keep the baffle cold.

The optical baffle systems of the past seem to be divided into two categories: baffles which are entirely absorptive; and baffles which are entirely reflective on both sides. Both systems have advantages but present the designer of optical systems with a faulty dilemma: the baffles need not be entirely absorptive nor entirely reflective, but can adopt the advantages of both designs. Additionally, the use of the phase conjugate mirror of the above-cited Cronin-Golomb reference allows the telescope baffles to present a retro-reflective array which reflects back off-axis rays at their angles of incidence. However, the use of true phase congugate mirrors is impractical.

SUMMARY OF THE INVENTION

The present invention includes a telescope baffle system which has the property of retro-directing unwanted off-axis radiation, thereby improving the off-axis rejection properties of telescope systems Additionally, because of its retro-directivity, high-reflectivity and low scatter properties, the heat load on telescope systems is greatly reduced when compared with current systems which are designed to absorb and/or scatter diffusely the unwanted radiation by using black paint or material.

The embodiment of the telescope baffle system includes a plurality of annular rings fixed inside the optical tubes of various stages of an optical telescope. Each annular ring is a flat annular flange or a truncated cone which intrudes into the interior of the optical tube and performs as a retro-reflective collar. The input surfaces of each annular ring facing the incoming radiation are arrays of retro-reflectors. The back surface of the annular rings and the inner surface of the baffle tube are painted with a black absorbing paint. The retro-reflectors reflect the majority of the off axis rays back to the source in a direction parallel and nearly coincident to the incoming rays. The retro-reflector arrays have a small fraction of the off-axis radiation being scattered to the backside of the annular rings or the inside surface of the baffle tube where they are absorbed by the black paint.

One advantage of this design is that most of the unwanted off-axis radiation is reflected back to the source. This results in reduced levels of off-axis radiation reaching the optical surfaces of the telescope and reduced off axis radiation reaching the detectors. Another advantage is the important property that the heat load on the baffle assembly is tremendously reduced. This is an important advantage for an infrared sensor where the baffle telescope must be cooled to very low temperature.

It is an object of the present invention to provide a telescope baffle system so that unwanted off-axis radiation is reflected back to the source, rather then absorbed by the telescope.

It is another object of the invention to reduce the thermal and optical contamination caused by off-axis radiation on telescope systems.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

An optical sensor consists of a detector (or array of detectors), a telescope (or optical system) to define the field of view and focus light or radiation onto the detectors and a baffle to prevent unwanted off-axis radiation from reaching the telescope and eventually reaching the detectors. This invention consists of an improvement in the baffle design which results in reduced levels of off-axis radiation reaching the detector and reduced amount of off-axis thermal radiation required to be absorbed by the baffle.

Figure 1:
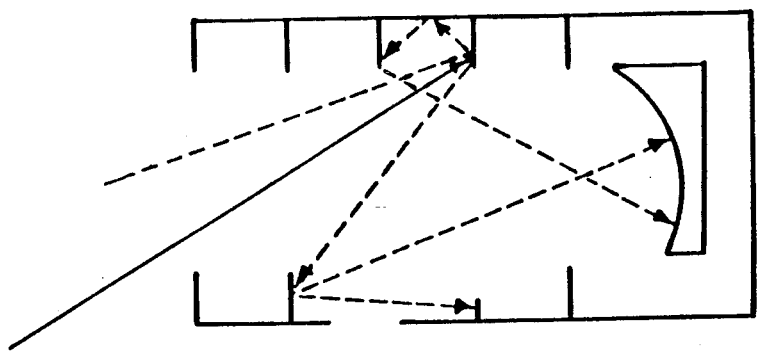
FIG. 1 is an illustration of a prior art telescope baffle with black absorbing baffle elements.

The reader's attention is now directed towards FIG. 1. FIG. 1 is an illustration of a prior art telescope baffle with black absorbing baffle elements Since the elements do not absorb 100% of the off-axis radiation that strikes them, it is possible for the off-axis radiation to be reflected onto the internal optical elements of the telescope, and contaminate the on-axis optical signal.

The purpose of FIG. 1 is to illustrate one of the disadvantages of the prior art black absorbing baffle systems. Another disadvantage in purely absorbtive systems is that absorption of radiation at infrared radiation wavelengths (1-1,000 microns) can result in a major heat load for cooling systems.

Figure 2:
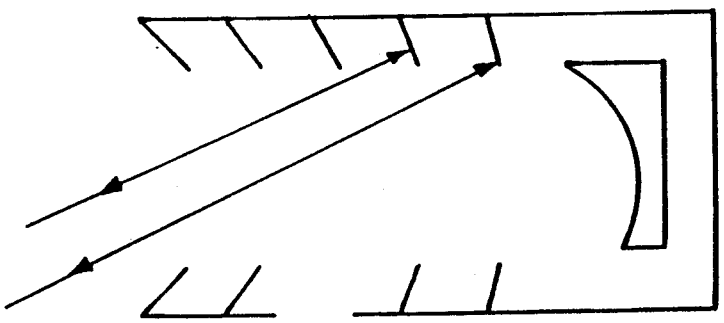
FIG. 2 is an illustration of an embodiment of the present invention using retro-directive baffle elements.

The system of FIG. 2 is an embodiment of the telescope baffle system of the present invention. In FIG. 2 the baffle elements are each covered with a pseudo phase conjugate mirror on their input sides. As described in the above-cited Cronin-Golomb reference, an incident beam striking a phase conjugate mirror is reflected back along its angle of incidence. As an optional feature, the rearward side of the baffle elements may be coated with an absorptive black coating for additional protection of the optical elements from off-axis radiation. Pseudo phase conjugate mirror elements consisting of arrays of small cube corner retro-reflectors are commercially available, and are produced by the Reflexite Corporation of New Britain, Conn. and the 3M Company, of St. Paul, Minn. An example is described in the above-cited Nelson et al. reference.

Figure 3:
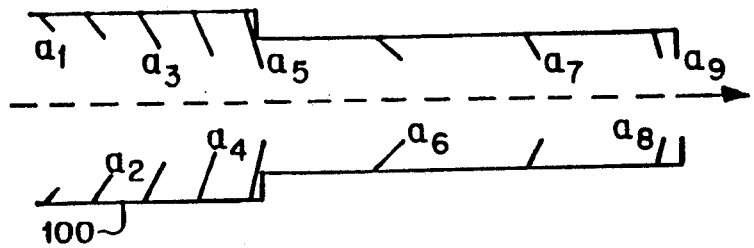
FIG. 3 is a side view of an embodiment of the invention used with a refracting telescope system.

The reader's attention is now directed towards FIG. 3 which is an illustration of a generic type of telescope baffle which could use annular arrays of retro-reflectors; however the use of such retro-reflector annular arrays is applicable to any type of telescope which requires baffling. The baffle consists of a series of annular rings a1 to a9 inside a baffle tube as shown in the figure. The left surfaces of each annular ring facing the incoming radiation are arrays of retro-reflectors. The back surface of the annular rings and the inner surface of the baffle tube are painted with a black absorbing paint. The retro-reflectors reflect the majority of the off-axis rays back to the source in a direction parallel and nearly coincident to the incoming rays. The retro-reflector arrays have a small fraction of the off-axis radiation being scattered to the backside of the annular rings or the inside surface of the baffle tube where they are absorbed by the black paint.

As mentioned above, one advantage of this design is that most of the unwanted off-axis radiation is reflected back to the source rather than being absorbed or scattered by the baffle surfaces. This results in reduced levels of off-axis radiation reaching the optical surfaces of the telescope and reduced off-axis radiation reaching the detectors. Another advantage is that the heat load on the baffle assembly is tremendously reduced. This is an important advantage for an infrared sensor where the baffle and telescope must be cooled to very low temperatures. Another advantage is that this method primarily depends on the reflective properties of the surface coating of the retro-reflectors. Very good metal coatings which are highly reflective and effective over a broad wavelength region are available, whereas black coatings have absorbing properties which vary significantly with wavelength.

In order to reject off-axis radiation which comes from a large range of off axis angles, the retro-reflecting annuli should be formed on concave or conical surfaces. Potential alternative designs are described below. The concavity of the annular surfaces indicated in FIG. 3 start as a plane surface at a9 and the concavity increases gradually with each annulus moving toward $a_1$. This variation of the design results in more efficient operation over a wider range of off-axis angles. The current state-of-the-art is such that these arrays can be made by a replicating process which ensures that they can be deposited on planar or curved surfaces. Also for this improved alternative design, the period of the retrodirective array can be modified for easier manufacturing as the diffraction properties of the arrays become irrelevant near the front end of the telescope tube at $a_1$.

For telescope systems with pointing capability the annuli need not be completely around the inside of the telescope tube but could be half-circle as shown in frontal view in FIG. 4, where the high-background radiation is located below the telescope axis. This applies to all annuli.

Figure 4:
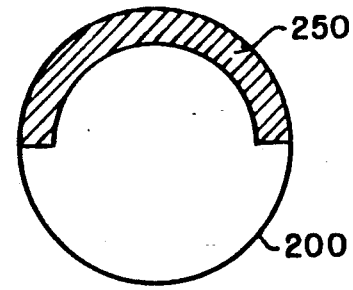
FIG. 4 is an end view of a baffle system using semi-circular retro-reflective arrays.

FIG. 4 is an end view of a telescope tube 200 in which off-axis radiation is reflected by a set of semi-circular retro-arrays 250. The semi-circular retro-arrays 250 resemble the baffle assembly of FIG. 1 except that the protruding flanges form a half-circle collar. The half-circle collars all have a metal coating on their input sides, and a flat black coating on their detector sides. (The input side is the side at which radiation enters the telescope.) The metal coatings may be deposited by any of the metal deposition techniques used to coat mirrors and reflectors. These methods include, sputtering, spray painting, vapor deposition, electro-deposition, and eutectics. Similarly, the flat black coating on the vector side may be applied by spray painting and other conventional methods. The flange length (annulus) and spacing (period) between the individual half-circle collars of FIG. 4 and annular collars of FIG. 3 will vary with the different applications and optical devices used. These lengths and spacings are best determined empirically for the different applications to determine their optimum configuration. A summary of experiments with retrodirective arrays is presented in an article by Stephen F. Jacobs, entitled "Experiments with Retrodirective Arrays," published in Opt. Engr. Vol. 21, No. 2, p. 281, 1982 the disclosure of which is incorporated herein by reference.

Figure 5:
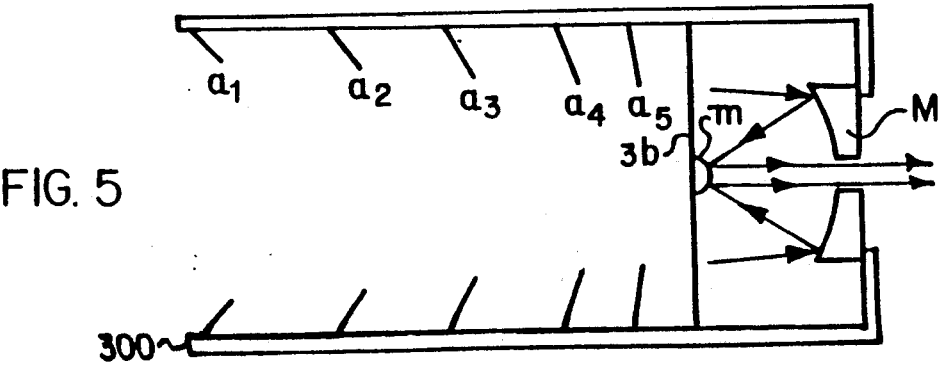
FIG. 5 is a side view of the present invention used with a reflecting telescope system.

The baffle system of FIG. 3 was applied to a refracting telescope which uses lenses to focus an incoming image. FIG. 5 is an illustration of the application of the present invention to a reflecting telescope system. The system of FIG. 5 includes five retro-reflector annular arrays $a_1$–$a_5$. Each annulus has an absorbing layer of black paint on its backside, and a reflective coating on its input side.

One purpose of FIG. 5 is to illustrate a design principle in an embodiment of the present invention. More specifically, the baffle configuration of FIG. 5 is characterized by a telescope baffle in which the curvature of the annuli is nonuniform, and decreases as one progresses into the telescope. This characteristic is discussed below. Other embodiments of the invention have a constant curvature of the annuli.

The reflecting telescope system of FIG. 5 has a baffle section which circumscribes five retro-reflector annuli $a_1$–$a_5$ and terminates in a main mirror M which reflects the image back to a secondary mirror m. Light from the secondary mirror m is reflected out a central aperture in the main mirror M. The secondary mirror m is fixed in place by a set of thread-like supports called spiders 3b.

While only five annuli are depicted in FIG. 5, this is intended as only an example. Any number of retroreflector or reflector arrays may be used, depending upon the application. In FIG. 5, the curvature of the annuli diminishes as one progresses into the telescope, with the innermost annular array A5 having the least curvature. Although the baffle elements as described are of a circle which have a curvature, the radii of the circles can be so large that the elements are nearly planar or are in fact planar.

Figure 6B:
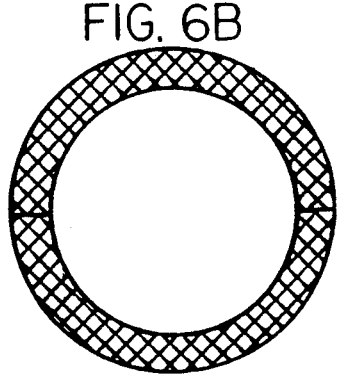
FIGS. 6A-6C form a perspective illustration of the system of FIG. 2 which shows the details of a retro-directing baffle.
Figure 6A:
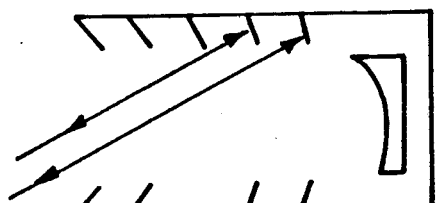
Figure 6C:
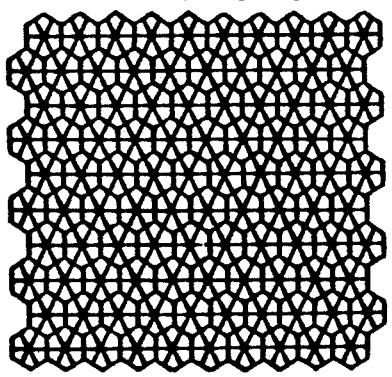

FIGS. 6A-6C form a perspective illustration of the system of FIG. 2, and provide a detailed view of an individual retro-reflective annulus. A typical period (center-to center distance of each cube-corner element) of available retro-reflecting arrays is on the order of 150 $\mu$m; which corresponds to a factor of 15 greater than the wavelength of 10 $\mu$m radiation. The period or element size of the retro-reflecting arrays could be optimized for the wavelength region of interest as well as their location along the telescope tube.

Figure 7B:
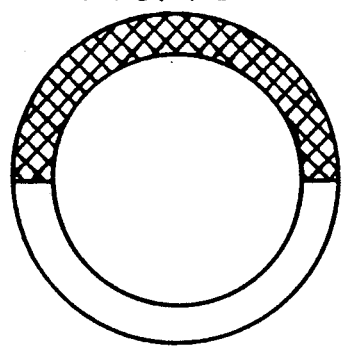
FIGS. 7A-7C form a perspective illustration showing another embodiment of the baffle system.
Figure 7A:
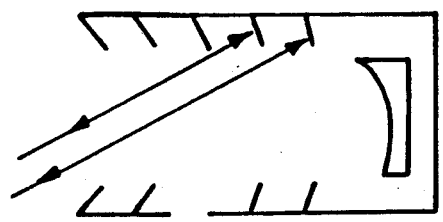
Figure 7C:
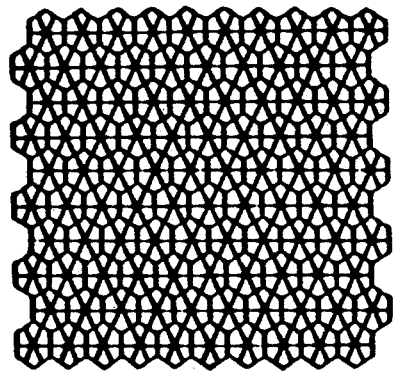

FIGS. 7A-7C are a similar view, but provide details of another embodiment of the baffle. More specifically, the system of FIGS. 7A-7C has baffle elements in which the top portion is a retro-reflective semi circle, and the bottom portion has an absorptive face. The system of FIGS. 7A-7C is appropriate where off-axis radiation comes principally from below the telescope field of view. Therefore, only the top half of the baffle needs the retro-reflective surface, while the bottom portion has the absorptive surface.

The system of FIGS. 6A-6C is appropriate for space applications, where off-axis radiation can come from any origin in a 360 degree circumference. Therefore, in FIGS. 6A-6C, the entire baffle has a retro-reflective surface.

As described above, the present invention concerns a new concept in telescope baffle design. The properties of this new baffle structure are such that a minimal amount of unwanted (out of field of view) off-axis radiation reaches the depths of the baffle and thereby reduces the off-axis radiation which reaches the telescope optical components and sensor detectors.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A telescope baffle system for use with any optical instrument which processes light with both on-axis radiation and off-axis radiation, wherein said optical instrument has a chamber which conducts said light along an optical axis from an input side to optical elements on an output side, and wherein said telescope baffle system comprises a plurality of retro-reflector array elements which are mounted inside said chamber, said plurality of retro-reflector array elements having retro-reflective surfaces which face said input side of said chamber to eliminate off-axis radiation, said retroreflector array elements each having an absorptive coating on their output side to absorb off-axis radiation so that it is not reflected back towards said optical instrument.

2. A telescope baffle system, as defined in claim 1, wherein each of said retro-reflector array elements comprises an annular retro-reflective collar which is fixed inside said chamber, said annular retro-reflective collar forming a ring which has a center corresponding with the optical axis of said light to permit on-axis radiation to be conducted on to said optical elements, said annular retro-reflective collar having a retro-reflective coating on its input side which faces said input side of said chamber which forms thereby one of said retro-reflective surfaces which eliminates said off-axis radiation.

3. A telescope baffle system, as defined in claim 2, wherein said annular retro-reflective collar has a pseudo phase conjugate mirror on its input side which faces the input side of said chamber, said pseudo phase conjugate mirror reflecting off-axis radiation back along its angle of incidence to prevent it from reaching the optical elements of said optical instrument.

4. A telescope baffle system, as defined in claim 3, wherein said annular retro-reflective collars have tilts and measurements of curvatures such that said annular retro-reflective collars have a concave surface on their input sides which face the input side of said chamber, and wherein said retro-reflective arrays have periods which are nonuniform and reduced as one progresses from the input side of the chamber towards the output side of the chamber.

5. A telescope baffle system, as defined in claim 3, wherein said annular retro-reflective collars have tilts and measurements of curvatures such that said annular retro-reflective collars have a concave surface on their input sides which face the input side of said chamber, and wherein said retro-reflective arrays collars have periods which are constant and reduced as one progresses from the input side of the chamber towards the output side of the chamber.

6. A telescope baffle system, as defined in claim 2, wherein said annular retro-reflective collars have tilts and measurements of curvatures such that said annular retro-reflective collars have a concave surface on their input sides which face the input side of said chamber, and wherein said curvatures and tilts are nonuniform and are reduced as one progresses from the input side of the chamber towards the output side of the chamber.

7. A telescope baffle system, as defined in claim 1, wherein each of said retro-reflector array elements comprises a semi-circular retro-reflective collar which is fixed inside said chamber, said semi-circular retro-reflective collar forming a semi-circle which has center corresponding with the optical axis of said light to permit on-axis radiation to be conducted on to said optical elements, said semi-circular retro-reflective collar having a reflective coating on its input side which faces said input side of said chamber which forms thereby one of said retro-reflective surfaces which eliminates said off-axis radiation.

8. A telescope baffle system, as defined in claim 7, wherein said semi-circular retro-reflective collars have tilts and curvatures such that said semi-circular retro-reflective collars have a concave surface on their input sides which face the input side of said chamber, and wherein said semi-circular retro-reflective collars have periods which are nonuniform and reduced as one progresses from the input side of the chamber towards the output side of the chamber.

9. A telescope baffle system, as defined in claim 7, wherein said semi-circular retro-reflective collars have tilts and curvatures such that said semi-circular retro-reflective collars have a concave surface on their input sides which face the input side of said chamber, and wherein said semi-circular retro-reflective collars have periods which are constant as one progresses from the input side of the chamber towards the output side of the chamber.

10. A telescope baffle system for use with any optical instrument which processes light with both on-axis radiation and off-axis radiation, wherein said optical instrument has a chamber which conducts said light along an optical axis from an input side to optical elements on an output side, and wherein said telescope baffle system comprises a plurality of retro-reflector array annuli which are fixed inside said chamber, said plurality of retro-reflector array annuli having retro-reflective surfaces which face said input side of said chamber to eliminate off-axis radiation.

11. A telescope baffle system, as defined in claim 10, wherein each of said retro-reflector array annuli comprises an annular retro-reflective collar which is fixed inside said chamber, said annular retro-reflective collar forming a ring which has a center corresponding with the optical axis of said light to permit on-axis radiation to be conducted onto said optical elements, said annular retro-reflective collar being a pseudo phase conjugate mirror on its input side which faces said input side of said chamber which forms thereby one of said retro-reflective surfaces which eliminates said off-axis radiation by reflecting off-axis radiation back along its angle of incidence.

12. A telescope baffle system, as defined in claim 11, wherein said annular retro-reflective collars have curvatures and tilts such that said annular retro-reflective collars have a concave surface on their input sides which face the input side of said chamber, and wherein said curvatures and tilts are nonuniform and reduced as one progresses from the input side of the chamber towards the output side of the chamber.

13. A telescope baffle system, as defined in claim 11, wherein each of said annular retro-reflective collars has an inner diameter which decreases as one progresses from the input side of the chamber towards the output side of the chamber.

14. A telescope baffle system, as defined in claim 13, wherein said annular retro-reflective collars have measurements of curvatures such that said annular retro-reflective collars have a concave surface on their sides which face the input side of said chamber, and wherein said curvatures are nonuniform and reduced as one progresses from the input side of the chamber towards the output side of the chamber.

15. A telescope baffle system, as defined in claim 10, wherein each of said retro-reflector array annuli comprises a semi-circular retro-reflective array collar which is fixed inside said chamber, said semi-circular retro-reflective collar forming a semi-circle which has a center corresponding with the optical axis of said light to permit on-axis radiation to be conducted on to said optical elements, said semi-circular retro-reflective collar having a reflective coating on its input side which faces said input side of said chamber which forms thereby one of said retro-reflective surfaces which eliminates said off-axis radiation.

16. A telescope baffle system, as defined in claim 15, wherein said semi-circular retro-reflective collars have curvatures such that said annular retro-reflective collars have a concave surface on their input sides which face the input side of said chamber, and wherein said curvatures are nonuniform and reduced as one progresses from the input side of the chamber towards the output side of the chamber.

17. A telescope baffle system, as defined in claim 16, wherein said semi-circular retro-reflective collars have varying curvatures with separation distances which are nonuniform.

18. A telescope baffle system, as defined in claim 16, wherein said semi-circular retro-reflective collars have varying curvatures with separation distances which are constant.

19. A telescope baffle system, as defined in claim 15, wherein said semi-circular retro-reflective collar has a black absorptive coating on its output side which faces the output side of said chamber, said black absorptive coating absorbing of-axis radiation to prevent it from reaching the optical elements of said optical instrument.

20. A telescope baffle system, as defined in claim 19, wherein said semi-circular retro-reflective collars have curvatures and separation distances which are nonuniform as required to optimize off-radiation rejection.

* * * * *